(12) United States Patent
Qiu et al.

(10) Patent No.: US 12,349,041 B2
(45) Date of Patent: Jul. 1, 2025

(54) INTELLIGENT INTERNET OF THINGS INTEGRATED PERCEPTION SYSTEM AND METHOD THEREOF

(71) Applicant: Tianjin University, Tianjin (CN)

(72) Inventors: Tie Qiu, Tianjin (CN); Ning Chen, Tianjin (CN); Haodong Wang, Tianjin (CN); Keqiu Li, Tianjin (CN); Xiaobo Zhou, Tianjin (CN); Tao Li, Tianjin (CN); Jiancheng Chi, Tianjin (CN)

(73) Assignee: Tianjin University, Tianjin (CN)

( * ) Notice: Subject to any disclaimer, the term of this patent is extended or adjusted under 35 U.S.C. 154(b) by 43 days.

(21) Appl. No.: 17/907,210

(22) PCT Filed: Sep. 7, 2021

(86) PCT No.: PCT/CN2021/116815
§ 371 (c)(1),
(2) Date: Dec. 22, 2022

(87) PCT Pub. No.: WO2022/262127
PCT Pub. Date: Dec. 22, 2022

(65) Prior Publication Data
US 2024/0214905 A1  Jun. 27, 2024

(30) Foreign Application Priority Data

Jun. 17, 2021 (CN) .................. 202110670334.X

(51) Int. Cl.
*H04W 40/24* (2009.01)
*G16Y 20/10* (2020.01)
(Continued)

(52) U.S. Cl.
CPC ............. *H04W 40/24* (2013.01); *G16Y 20/10* (2020.01); *H04W 4/38* (2018.02); *H04W 76/10* (2018.02); *H04W 84/18* (2013.01)

(58) Field of Classification Search
CPC ....... H04W 40/24; H04W 4/38; H04W 76/10; H04W 84/18; H04W 16/18; G16Y 20/10
See application file for complete search history.

(56) References Cited

U.S. PATENT DOCUMENTS 9,900,172 B2 * 2/2018 Goel ...................... H04W 84/18
10,334,446 B2 * 6/2019 Ashrafi ................... H04L 43/20
(Continued)

*Primary Examiner* — Eunsook Choi
(74) *Attorney, Agent, or Firm* — Wang Law Firm, Inc.

(57) ABSTRACT

The present invention discloses an intelligent internet of things integrated perception system and method thereof, the integrated perception system comprises a data perception layer (1); a connection and transmission layer (2); an edge computation layer (3); a cloud computation layer (4); an application layer (5). The data perception layer (1) is composed of a plurality of sensor device nodes, and transmits the monitored environmental data to the edge computation layer (3) through the connection and transmission layer (2); the cloud computation layer (4) performs data fusion according to data provided by each edge computation device, and forms action instructions for the plurality of application devices. Multi-layer IoT integrated perception is realized, and the requirement for the comprehensive and integrated processing of different types of data in the IoT is satisfied, realizes the deployment of the monitoring network topology of the data perception layer and improves the monitoring efficiency of the sensor device nodes.

13 Claims, 2 Drawing Sheets

(51) Int. Cl.
*H04W 4/38* (2018.01)
*H04W 76/10* (2018.01)
*H04W 4/18* (2009.01)
*H04W 84/18* (2009.01)

(56) References Cited

U.S. PATENT DOCUMENTS

| | | | |
|---|---|---|---|
| 10,750,360 B2* | 8/2020 | Morin | G06N 5/025 |
| 11,997,588 B2* | 5/2024 | Liao | G08G 5/22 |
| 2015/0319803 A1* | 11/2015 | Hosny | H02H 7/262 |
| | | | 702/60 |
| 2018/0212863 A1* | 7/2018 | Akcan | H04L 45/026 |
| 2019/0007496 A1* | 1/2019 | Khanna | H04W 52/02 |
| 2019/0222652 A1* | 7/2019 | Graefe | H04L 67/12 |

* cited by examiner

INTELLIGENT INTERNET OF THINGS INTEGRATED PERCEPTION SYSTEM AND METHOD THEREOF

TECHNICAL FIELD OF THE INVENTION

The present invention relates to the field of the IoT, and in particular to an intelligent internet of things integrated perception system and method thereof.

BACKGROUND OF THE INVENTION

The Internet of Things (IOT) is a complex integration of multiple disciplines, and its application objects are constantly being fused in various fields of the society and play an increasingly important role in realizing the Internet of Everything.

Chinese Invention Patent Application CN202110121948.2 disclosed an IoT integrated management platform and method based on an smart brain, wherein the platform comprises: an initial setup module configured to set a preset number of servers, associate the servers and set a management function for the servers; a device connection module configured to connect the servers to the respective IoT devices so that the servers receive the data transmitted by the respective IoT devices and also control the IoT devices; a data acquisition module configured to acquire the communication state data of the plurality of IoT devices and the device operation data of the plurality of IoT devices and determine a first data list corresponding to the communication state data and a second data list corresponding to the device operation data; and, an integrated management module configured to import the first data list and the second data list into a standard database and perform integrated management by using the imported data, so that the global analysis of the whole smart park, community or building is realized and the normal operation of the whole smart park, community or building is ensured.

However, the IoT integrated management platform in the Invention Patent Application CN202110121948.2 has some problems. The perception layer involved in the IoT integrated management platform is single, and it is only limited to the acquisition of the communication state data and operation data of the plurality of IoT devices. In addition, each IoT device is connected to the respective server through the device connection module, but the data acquisition modules cannot realize intelligent self-learning and self-optimization due to the lack of interaction among different data acquisition modules, so that it is difficult to realize the integrated perception for the IoT.

SUMMARY OF THE INVENTION

It is a first object of the present invention to provide an intelligent internet of things integrated perception system which can satisfy the requirements for interaction among different data acquisition modules and realize the integrated perception of a plurality of IoT devices.

It is a second object of the present invention to provide an intelligent internet of things integrated perception method of the integrated perception system.

For achieving the first object, the intelligent internet of things integrated perception system comprises a data perception layer; a connection and transmission layer; an edge computation layer; a cloud computation layer; an application layer composed of a plurality of application devices;

the data perception layer is composed of a plurality of sensor device nodes, each of the sensor device nodes monitors different environmental data;

the connection and transmission layer is composed of a plurality of wireless communication modules, each sensor device node has at least one wireless communication module, the plurality of wireless communication modules form a wireless sensing network, the connection and transmission layer is connected to the data perception layer; the connection and transmission layer receives the environment monitoring data transmitted by the data perception layer, and the wireless communication modules of the connection and transmission layer employ a self-learning topology control mechanism and a hierarchical collaborative perception node monitoring mechanism;

the edge computation layer is composed of a plurality of edge computation devices, the edge computation layer is connected to the connection and transmission layer and receives the environment monitoring data transmitted by the connection and transmission layer;

the cloud computation layer is composed of a cloud computation center, the cloud computation layer is connected to the edge computation layer, the cloud computation center performs data fusion according to data provided by each edge computation device of the edge computation layer, and forms action instructions for the plurality of application devices;

the application layer is connected to the cloud computation layer (4), each application device receives an action instruction from the cloud computation center and executes the received action instruction.

Preferably, in the intelligent internet of things integrated perception system, each sensor device node in the data perception layer uploads data by a self-networking method, the self-networking method comprises the following steps:

step 1: pre-storing a direct-connected node list in each sensor device node, wherein the direct-connected node list in any sensor device node comprises a sensor device node directly connected to the any sensor device node, the node address of this sensor device node, and the node address of a sensor device node for a next hop of the data directly forwarded by this sensor device node;

step 2: using any sensor device node in the data perception layer as a starting node of self-networking, and labeling the any sensor device node, wherein the labeling comprises labeling the any sensor device node as being networked, initializing the direct-connected node list of the any sensor device node as zero, and setting the node address of the any sensor device node as an edge device address;

step 3: when any new node joins in the data perception layer, the any new node searching and determining the networked nodes within the communication range of the new node;

when there are no networked nodes, the process proceeds to step 4; when a network node is found, the process proceeds to step 5;

step 4: the any new node continuously re-searching networked nodes within communication range of the new node for a preset time, and making judgment according to the result of re-searching;

when there are no networked nodes, the any new node labels itself as the starting node of self-networking, and the process proceeds to step 2; or otherwise, the process proceeds to step 5;

step 5: any new node locking the existing networked node, and interacting with the locked existing networked node;

step 6: determining whether a connection relationship is capable of being established between any new node and the existing networked node;

when the connection relationship is capable of being established between the both, the new node is labeled as being in a networked state, and the node address of the locked networked node is set as the node address of the sensor device node of a next hop of the data directly forwarded by the any new node, and the process proceeds to step 7; or otherwise, the process proceeds to step 8;

step 7: all the networked sensor device nodes uploading the respective monitored environmental data to the edge computation devices through the connection and transmission layer, wherein the sensor device nodes that do not upload environmental data are in a sleep state;

step 8: the new node discarding the existing networked node, and the process proceeding to step 3.

Preferably, in the intelligent internet of things integrated perception system, the edge computation devices perform self-learning topology control on the topological relationship among all sensor device nodes in the system by a method comprising the following steps a1 to a6:

step a1: an edge device acquiring the connection relationship of a new sensor device node joining in the system in the data perception layer, and refreshing global sensor network topology information in the edge device, wherein the global sensor network topology information is the current topological connection relationship among all sensor device nodes in the data perception layer;

step a2: the edge device optimizing the topological connection relationship of all sensor device nodes in the data perception layer, and generating a new topological connection relationship;

step a3: the edge device comparing the new topological connection relationship with the current topological connection relationship to obtain a difference in topological connection relationship, and transmitting the difference in topological connection relationship as topological relationship alteration command information to a sensor device node whose topological connection relationship needs to be altered;

step a4: for each piece of topological relationship alteration command information, the edge device computing the optimal path from the sensor device node to the edge device corresponding to the topological relationship alteration command information;

step a5: the sensor device node that receives the topological relationship alteration command information determining the position of this sensor device node in the corresponding optimal path, and performing processing according to the determined position;

when the sensor device node is not the last node in the corresponding optimal path, the sensor device node forwards the optimal path to the sensor device node at the next position to realize the self-learning topology control of the topological relationship of this sensor device node; or otherwise, the sensor device node alters the direct-connected node list of this sensor device node according to the topological relationship alteration command information and alters the node address of the sensor device node of a next hop of the data directly forwarded by the sensor device node, to realize the self-learning topology control of the topological relationship of this sensor device node;

step a6: for all sensor device nodes in the data perception layer, executing steps a4 to a5 successively to realize the self-learning topology control of the topological relationship among all sensor device nodes in the system.

Preferably, in the intelligent internet of things integrated perception system, each sensor device node in the data perception layer realizes node fault monitoring and reporting by a node monitoring method comprising the following steps b1 to b4:

step b1: pre-storing a node monitoring list in each sensor device node, wherein the node monitoring list in any sensor device node comprises a sensor device node sequence to be monitored by the any sensor device node, and the sensor device node sequence comprises at least one sensor device node to be monitored by the any sensor device node;

step b2: the any sensor device node transmitting a detection frame to all sensor device nodes in the sensor device node sequence in the stored node monitoring list when any sensor device node in the data perception layer executes node monitoring;

step b3: upon receiving the detection frame, the sensor device node in the sensor device node sequence in the node monitoring list transmitting an acknowledgement frame to the sensor device node that transmits the detection frame;

step b4: the any sensor device node that transmits the detection frame making judgment according to the acknowledgement frame fed back by each sensor device node in the sensor device node sequence;

when the any sensor device node does not receive the acknowledgement frame from any sensor device node in the sensor device node sequence for N consecutive times, it is determined that this sensor device node in the sensor device node sequence is faulted; or otherwise, it is determined that this sensor device node in the sensor device node sequence is not faulted, where N≥2 and is a positive integer.

Preferably, in the intelligent internet of things integrated perception system, the edge device deploys the monitoring network topology of the data perception layer by a method comprising the following steps c1 to c4:

step c1: the edge device classifying all sensor device nodes in the data perception layer into different levels;

step c2: the edge device generating a monitoring network topological relationship corresponding to the data perception layer according to the communication range of each sensor device node, wherein the sensor device node monitors sensor device nodes of the same level within the communication range;

step c3: the edge device generating a node monitoring list alteration command for each sensor device node according to the generated monitoring network topological relationship;

step c4: the edge device transmitting the node monitoring list alteration command to all sensor device nodes in the data perception layer to realize the deployment of the monitoring network topology.

For achieving the second object, the intelligent internet of things integrated perception method of the integrated perception system, wherein the method comprises the following steps:

monitoring environmental data by each sensor device node in the data perception layer, and transmitting the monitored environmental data to the edge computation layer through the connection and transmission layer;

performing processing according to the received environment monitoring data transmitted through the connection and transmission layer by the edge computation layer, and transmitting the data obtained after fusion to the cloud computation layer, wherein the edge computation layer executes self-learning topology control on the topological relationship among all sensor device nodes in the intelligent IoT integrated perception system;

performing the data fusion according to the data provided by each edge computation device in the edge computation layer by the cloud computation layer to generate action instructions to be provided for application devices;

executing the actions corresponding to the received action instructions according to the action instructions transmitted by the cloud computation layer by the application devices in the application layer.

Preferably, in the intelligent internet of things integrated perception method, the edge computation devices perform self-learning topology control on the topological relationship among all sensor device nodes in the system by a method comprising the following steps a1 to a6:

step a1: an edge device acquiring the connection relationship of a new sensor device node joining in the system in the data perception layer, and refreshing the global sensor network topology information in the edge device, wherein the global sensor network topology information is the current topological connection relationship among all sensor device nodes in the data perception layer;

step a2: the edge device optimizing the topological connection relationship of all sensor device nodes in the data perception layer, and generating a new topological connection relationship;

step a3: the edge device comparing the new topological connection relationship with the current topological connection relationship to obtain a difference in topological connection relationship, and the difference in topological connection relationship is transmitted as topological relationship alteration command information to a sensor device node whose topological connection relationship needs to be altered;

step a4: the edge device computing the optimal path from the sensor device node to the edge device corresponding to the topological relationship alteration command information according to each piece of topological relationship alteration command information;

step a5: the sensor device node that receives the topological relationship alteration command information determining the position of this sensor device node in the corresponding optimal path, and performing processing according to the determined position;

when the sensor device node is not the last node in the corresponding optimal path, the sensor device node forwards the optimal path to the sensor device node at the next position to realize the self-learning topology control of the topological relationship of this sensor device node; or otherwise, the sensor device node alters the direct-connected node list of this sensor device node according to the topological relationship alteration command information and alters the node address of the sensor device node of a next hop of the data directly forwarded by the sensor device node, to realize the self-learning topology control of the topological relationship of this sensor device node;

step a6: executing steps a4 to a5 successively for all sensor device nodes in the data perception layer, to realize the self-learning topology control of the topological relationship among all sensor device nodes in the system.

Preferably, in the present invention, the intelligent internet of things integrated perception method further comprises deploying the monitoring network topology of the data perception layer by the edge device, according to a method comprising the following steps c1 to c4:

step c1: the edge device classifying all sensor device nodes in the data perception layer into different levels;

step c2: the edge device generating a monitoring network topological relationship corresponding to the data perception layer according to the communication range of each sensor device node, wherein the sensor device node monitors sensor device nodes of the same level within the communication range;

step c3: the edge device generating a node monitoring list alteration command for each sensor device node according to the generated monitoring network topological relationship;

step c4: the edge device transmitting the node monitoring list alteration command to all sensor device nodes in the data perception layer to realize the deployment of the monitoring network topology.

preferably, in the present invention, the intelligent internet of things integrated perception method further comprises performing node fault monitoring and reporting by each sensor device node in the data perception layer according to a node monitoring method comprising the following steps b1 to b4:

step b1: pre-storing a node monitoring list in each sensor device node, wherein the node monitoring list in any sensor device node comprises a sensor device node sequence to be monitored by the any sensor device node, and the sensor device node sequence comprises at least one sensor device node to be monitored by the any sensor device node;

step b2: when any sensor device node in the data perception layer executes node monitoring, the any sensor device node transmitting a detection frame to all sensor device nodes in the sensor device node sequence in the stored node monitoring list;

step b3: upon receiving the detection frame, the sensor device node in the sensor device node sequence in the node monitoring list transmitting an acknowledgement frame to the sensor device node that transmits the detection frame;

step b4: the any sensor device node that transmits the detection frame making judgment according to the acknowledgement frame fed back by each sensor device node in the sensor device node sequence;

when the any sensor device node does not the acknowledgement frame from any sensor device node in the sensor device node sequence for N consecutive times, it is determined that this sensor device node in the sensor device node sequence is faulted; or otherwise, it is determined that this sensor device node in the sensor device node sequence is not faulted, where N≥2 and is a positive integer.

Preferably, the intelligent internet of things integrated perception method further comprises an operation of improving and optimizing the robustness of the current topological structure among all sensor device nodes in the data perception layer to output an optimal topological structure.

Compared with the prior art, the present invention has the following advantages.

Firstly, in the present invention, the data perception layer is formed by a plurality of sensor device nodes for acquiring different types of environmental data, and the environmental data monitored by these sensor device nodes are transmitted to the edge computation devices in the edge computation layer for processing through the connection and transmission layer. Then, the cloud computation layer performs fusion according to the data processed by the edge computation devices, to form instructions to be executed by different application devices in the application layer. Thus, multi-layer IoT integrated perception is realized, and the requirement for the comprehensive and integrated processing of different types of data in the IoT is satisfied.

Secondly, in the present invention, for the data perception layer formed by a plurality of sensor device nodes, the data is uploaded by a self-networking method and self-learning topology control is performed on the topological relationship among all sensor device nodes in the data perception layer by the edge computation devices. Thus, on the premise of ensuring network connectivity and coverage, the characteristics of the wireless sensing network formed by a plurality of wireless communication module are fully considered, and the network structure is optimized for the selection of different sensor device nodes according to different application scenarios, thereby ensuring the completion of predetermined data transmission tasks.

Finally, in the present invention, different levels of cooperative perception monitoring mechanisms are set for the cooperation mode among all sensor device nodes in the data perception layer. That is, the node monitoring list alteration commands corresponding to different sensor device nodes are generated by determining their own communication ranges of different sensor device nodes, thereby realizing the deployment of the monitoring network topology of the data perception layer and improving the monitoring efficiency of the sensor device nodes.

DETAILED DESCRIPTION OF THE INVENTION

The present invention will be further described in detail below by embodiments with reference to the accompanying drawings.

Figure 1:
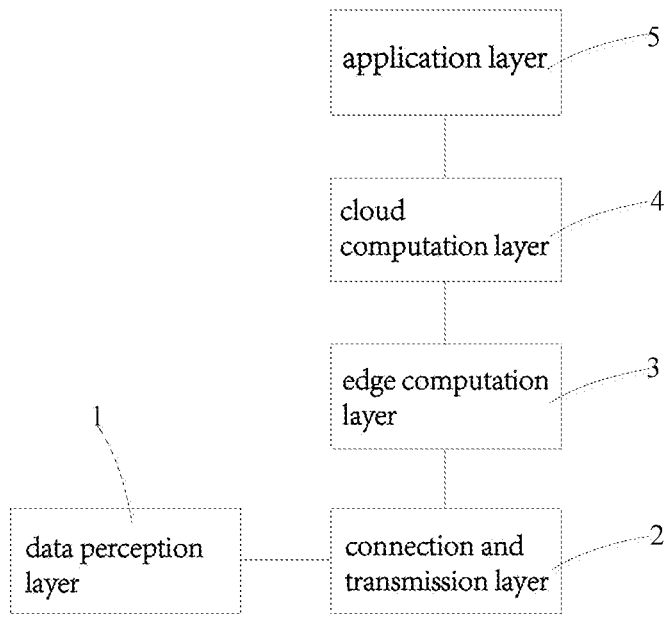
FIG. 1 is a schematic diagram of an intelligent internet of things integrated perception system according to an embodiment of the present invention.

Firstly, FIG. 1 shows an embodiment which provides an intelligent internet of things integrated perception system. As shown in FIG. 1, the intelligent internet of things integrated perception system in this embodiment comprises a data perception layer 1, a connection and transmission layer 2, an edge computation layer 3, a cloud computation layer 4 and an application layer 5, the connection and transmission layer 2 is respectively connected to the data perception layer 1 and the edge computation layer 3, and the cloud computation layer 4 is respectively connected to the edge computation layer 3 and the application layer 5; wherein:

the data perception layer 1 is composed of a plurality of (in this embodiment, "a plurality of" means comprising at least two, i.e., two or more) sensor device nodes, each of the sensor device nodes respectively monitors different environmental data; and, in the data perception layer, each sensor device node uploads data by a self-networking method comprising the following steps 1 to 8, and each sensor device node realizes node fault monitoring and reporting by a node monitoring method comprising the following steps b1 to b4, wherein these sensor device nodes may be ultrasonic sensors, temperature sensors, humidity sensors, gas sensors, illustration sensors, smoke sensors, atmospheric pressure sensors, sound sensors, etc.

Specifically, the self-networking method comprises the following steps 1 to 8.

Step 1: pre-storing a direct-connected node list in each sensor device node, wherein the direct-connected node list in any sensor device node comprises a sensor device node directly connected to the any sensor device node, the node address of this sensor device node, and the node address of a sensor device node for a next hop of the data directly forwarded by this sensor device node.

Step 2: using any sensor device node in the data perception layer 1 as a starting node of self-networking, and labeling the any sensor device node, wherein the labeling comprises labeling the any sensor device node as being networked, initializing the direct-connected node list of the any sensor device node as zero, and setting the node address of the any sensor device node as an edge device address.

Step 3: when any new node joins in the data perception layer 1, the any new node searching and determining the networked nodes within the communication range of the new node.

When there are no networked nodes, the process proceeds to step 4; when a network node is found, the process proceeds to step 5, wherein the new node here refers to a new sensor device node.

Step 4: The any new node continuously re-searching networked nodes within communication range of the new node for a preset time (for example, the preset time for re-searching is set as 5 to 10 s), and making judgment according to the result of re-searching.

When there are no networked nodes, it indicates that there are no networked nodes in the data perception layer or there may be networked nodes that cannot perform communication due to fault, the process proceeds to step 2; or otherwise, the process proceeds to step 5.

Step 5: Any new node locking the existing networked node, and interacting with the locked existing networked node.

Step 6: Determining whether a connection relationship is capable of being established between any new node and the existing networked node.

When the connection relationship is capable of being established between the both, it indicates that the any new node operates normally, and the existing networked node can execute the reception and forwarding of the data packet.

The any new node can set the existing networked node as the destination of data transmission, so that the data uploading function is realized. The any new node is labeled as being in a networked state, that is, the any new node already joins in the data perception layer. The node address of the locked networked node is set as the node address of the sensor device node of a next hop of the data directly forwarded by the any new node, and the process proceeds to step 7; or otherwise, the process proceeds to step 8.

Step 7: all the networked sensor device nodes uploading the respective monitored environmental data to the edge computation devices through the connection and transmission layer 2, wherein the sensor device nodes that do not upload environmental data are in a sleep state.

Step 8: the new node discarding the existing networked node, and the process proceeding to step 3 to re-search the networked nodes within its own communication range.

In addition, the node monitoring method executed by the sensor device nodes in this embodiment comprises the following steps b1 to b4.

Step b1: Pre-storing a node monitoring list in each sensor device node, wherein the node monitoring list in any sensor device node comprises a sensor device node sequence to be monitored by the any sensor device node, and the sensor device node sequence comprises at least one sensor device node to be monitored by the any sensor device node.

Step b2: The any sensor device node transmitting a detection frame to all sensor device nodes in the sensor device node sequence in the stored node monitoring list when any sensor device node in the data perception layer 1 executes node monitoring.

Step b3: Upon receiving the detection frame, the sensor device node in the sensor device node sequence in the node monitoring list transmitting an acknowledgement frame to the sensor device node that transmits the detection frame.

Step b4: The any sensor device node that transmits the detection frame making judgment according to the acknowledgement frame fed back by each sensor device node in the sensor device node sequence.

When the any sensor device node does not receive the acknowledgement frame from any sensor device node in the sensor device node sequence for N consecutive times, it is determined that this sensor device node in the sensor device node sequence is faulted; or otherwise, it is determined that this sensor device node in the sensor device node sequence is not faulted, where N≥2 and is a positive integer.

The connection and transmission layer 2 is composed of a plurality of wireless communication modules, each sensor device node has at least one wireless communication module, the plurality of wireless communication modules form a wireless sensing network, the connection and transmission layer 2 is connected to the data perception layer 1; the connection and transmission layer 2 receives the environment monitoring data transmitted by the data perception layer 1, and the wireless communication modules of the connection and transmission layer 2 employ a self-learning topology control mechanism and a hierarchical collaborative perception node monitoring mechanism.

The edge computation layer 3 is composed of a plurality of edge computation devices, the edge computation layer 3 is connected to the connection and transmission layer 2 and receives the environment monitoring data transmitted by the connection and transmission layer 2. The edge computation devices in this embodiment perform self-learning topology control on the topological relationship among all sensor device nodes in the system by a method comprising the following steps a1 to a6.

Step a1: An edge device acquiring the connection relationship of a new sensor device node joining in the system in the data perception layer 1, and refreshing global sensor network topology information in the edge device, wherein the global sensor network topology information is the current topological connection relationship among all sensor device nodes in the data perception layer 1.

Step a2: The edge device optimizing the topological connection relationship of all sensor device nodes in the data perception layer 1, and generating a new topological connection relationship.

Step a3: The edge device comparing the new topological connection relationship with the current topological connection relationship to obtain a difference in topological connection relationship, and transmitting the difference in topological connection relationship as topological relationship alteration command information to a sensor device node whose topological connection relationship needs to be altered.

Step a4: For each piece of topological relationship alteration command information, the edge device computing the optimal path from the sensor device node to the edge device corresponding to the topological relationship alteration command information through a Dijkstra algorithm.

Step a5: The sensor device node that receives the topological relationship alteration command information determining the position of this sensor device node in the corresponding optimal path, and performing processing according to the determined position.

When the sensor device node is not the last node in the corresponding optimal path, the sensor device node forwards the optimal path to the sensor device node at the next position, and the sensor device node at the next position executes the same operation of determining its own position as this sensor device node until it is transmitted to the last node (i.e., the destination node) of the optimal path, so that the self-learning topology control of the topological relationship of this sensor device node is realized. Otherwise, the sensor device node alters the direct-connected node list of this sensor device node according to the topological relationship alteration command information and alters the node address of the sensor device node of a next hop of the data directly forwarded by the sensor device node, to realize the self-learning topology control of the topological relationship of this sensor device node. The topological relationship alteration command information gives the new direct-connected node list corresponding to the destination node, the list in the destination node is covered with this new list, and the original node address is covered with the new node address given in the topological relationship alteration command information.

Step a6: For all sensor device nodes in the data perception layer 1, executing steps a4 to a5 successively to realize the self-learning topology control of the topological relationship among all sensor device nodes in the system.

The cloud computation layer 4 is composed of a cloud computation center, the cloud computation layer 4 is connected to the edge computation layer 3, the cloud computation center performs data fusion according to data provided by each edge computation device of the edge computation layer 3, and forms action instructions for the plurality of application devices.

The application layer 5 is connected to the cloud computation layer 4, each application device receives an action instruction from the cloud computation center and executes the received action instruction.

It is to be noted that, in this embodiment, the edge device in the edge computation layer 3 deploys the monitoring network topology of the data perception layer 1 by a method comprising the following steps c1 to c4.

Step c1: The edge device classifying all sensor device nodes in the data perception layer into different levels. Here, the level classification may be performed according to the number of hops between the node and the edge device address and the number of direct-connected sub-nodes of this node (i.e., how many nodes set this node as the address of the "next hop"). For example, if the number of hops of a certain node away from the edge address device is smaller and the number of direct-connected nodes of this certain node is larger, it is considered that this certain node is more important and the level of this certain node is higher.

Step c2: The edge device generating a monitoring network topological relationship corresponding to the data perception layer 1 according to the communication range of each sensor device node, wherein the sensor device node monitors sensor device nodes of the same level within the communication range.

Step c3: The edge device generating a node monitoring list alteration command for each sensor device node according to the generated monitoring network topological relationship, wherein the generated monitoring network topological relationship will give nodes to be monitored by each node, i.e., a node monitoring node; for each node, the edge device will determine whether the new node monitoring list of this node is the same as the original node monitoring list; if the new node monitoring list of this node is the same as the original node monitoring list, no command will be transmitted to this node; and, if the new node monitoring list of this node is not the same as the original node monitoring list, the new node monitoring list is placed in the node monitoring list alteration command, the optimal path is acquired from the node topological connection relationship, and the monitoring list is transmitted to this node according to the optimal path.

Step c4: The edge device transmitting the node monitoring list alteration command to all sensor device nodes in the data perception layer to realize the deployment of the monitoring network topology.

Figure 2:
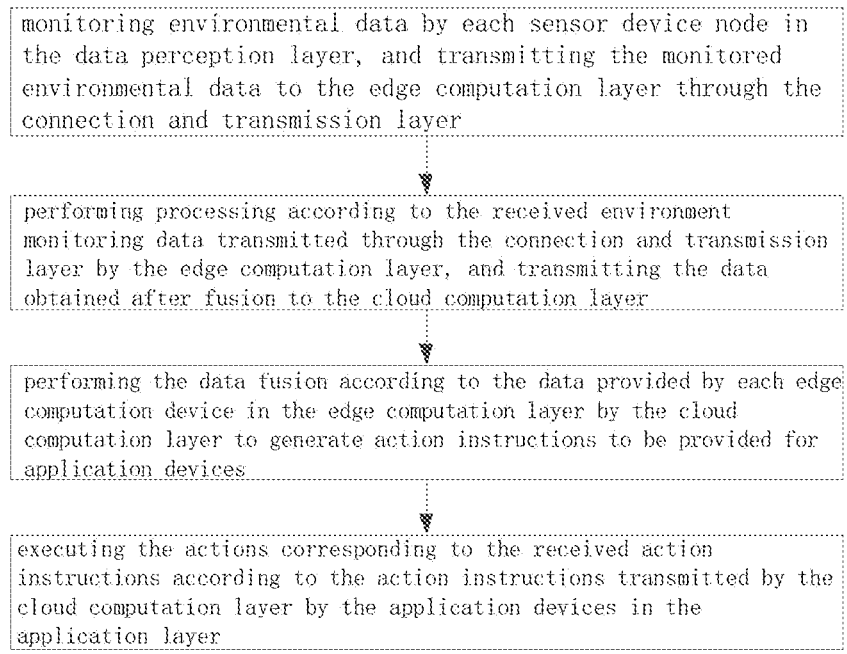
FIG. 2 is a flowchart of an intelligent internet of things integrated perception method according to the embodiment of the present invention.
Figure 3:
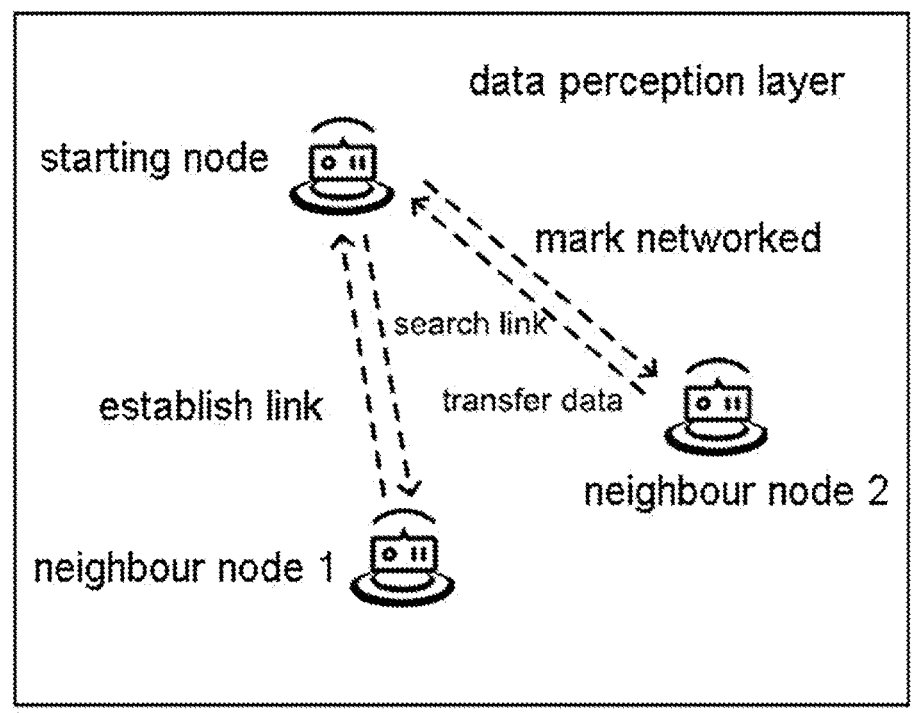
FIG. 3 is a schematic diagram of the data perception layer according to the embodiment of the present invention.
Figure 4:
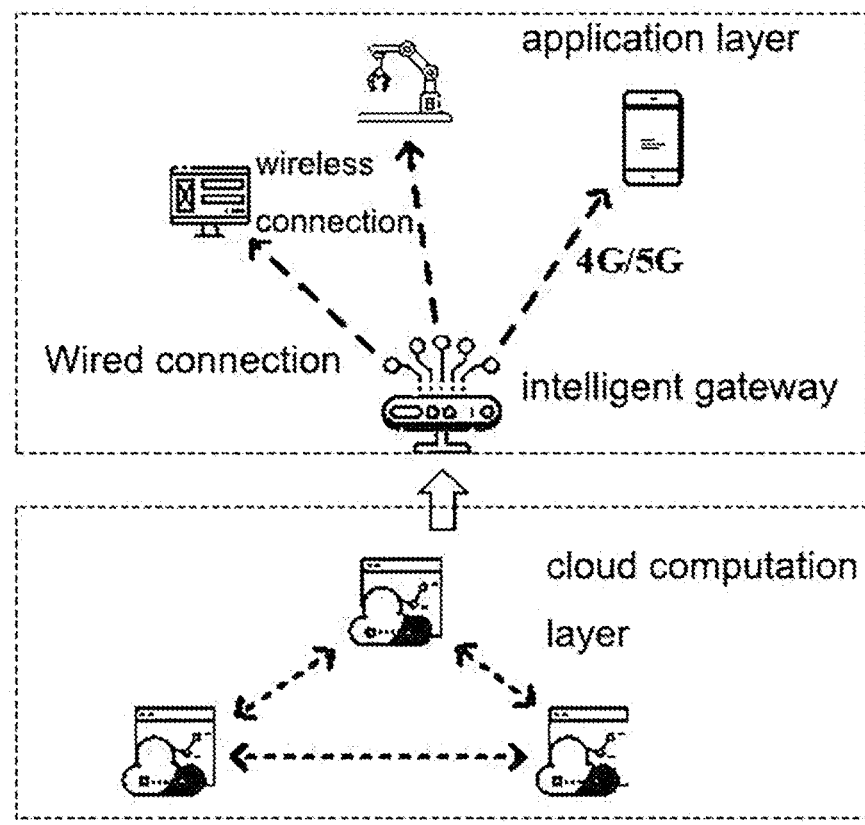
FIG. 4 is a schematic diagram of the interaction of the application layer with the cloud computation layer according to the embodiment of the present invention.

In the actual intelligent IoT integrated perception process, the edge device actually completes the hierarchical collaborative perception node monitoring mechanism by executing the steps c1 to c4, and the nodes monitor their states with each other, i.e., by a cooperative perception method. Thus, the faulted node in the system can be found fully and timely and then reported rapidly, so that the node monitoring efficiency is improved and the normal operation of the monitoring system is maintained. This embodiment further provides a intelligent IoT integrated perception method implemented by the intelligent IoT integrated perception system. Specifically, as shown in FIG. 2, the intelligent IoT integrated perception method in this embodiment comprises the following steps.

Step S1: monitoring environmental data by each sensor device node in the data perception layer 1, and transmitting the monitored environmental data to the edge computation layer 3 through the connection and transmission layer 2, wherein each sensor device node in the data perception layer 1 performs node fault monitoring and reporting according to a node monitoring method comprising the following steps b1 to b4.

Step b1: Pre-storing a node monitoring list in each sensor device node, wherein the node monitoring list in any sensor device node comprises a sensor device node sequence to be monitored by the any sensor device node, and the sensor device node sequence comprises at least one sensor device node to be monitored by the any sensor device node.

Step b2: When any sensor device node in the data perception layer 1 executes node monitoring, the any sensor device node transmitting a detection frame to all sensor device nodes in the sensor device node sequence in the stored node monitoring list.

Step b3: Upon receiving the detection frame, the sensor device node in the sensor device node sequence in the node monitoring list transmitting an acknowledgement frame to the sensor device node that transmits the detection frame.

Step b4: The any sensor device node that transmits the detection frame making judgment according to the acknowledgement frame fed back by each sensor device node in the sensor device node sequence.

When the any sensor device node does not the acknowledgement frame from any sensor device node in the sensor device node sequence for N consecutive times, it is determined that this sensor device node in the sensor device node sequence is faulted; or otherwise, it is determined that this sensor device node in the sensor device node sequence is not faulted, where N≥2 and is a positive integer.

Step S2: Performing processing according to the received environment monitoring data transmitted through the connection and transmission layer 2 by the edge computation layer 3, and transmitting the data obtained after fusion to the cloud computation layer 4, wherein the edge computation layer 3 executes self-learning topology control on the topological relationship among all sensor device nodes in the intelligent IoT integrated perception system. Specifically, the edge computation devices perform self-learning topology control on the topological relationship among all sensor device nodes in the system by a method comprising the following steps a1 to a6.

Step a1: An edge device acquiring the connection relationship of a new sensor device node joining in the system in the data perception layer 1, and refreshing the global sensor network topology information in the edge device, wherein the global sensor network topology information is the current topological connection relationship among all sensor device nodes in the data perception layer 1.

Step a2: The edge device optimizing the topological connection relationship of all sensor device nodes in the data perception layer 1, and generating a new topological connection relationship.

Step a3: The edge device comparing the new topological connection relationship with the current topological connection relationship to obtain a difference in topological connection relationship, and the difference in topological connection relationship is transmitted as topological relationship alteration command information to a sensor device node whose topological connection relationship needs to be altered.

Step a4: The edge device computing the optimal path from the sensor device node to the edge device corresponding to the topological relationship alteration command information according to each piece of topological relationship alteration command information.

Step a5: The sensor device node that receives the topological relationship alteration command information determining the position of this sensor device node in the corresponding optimal path, and performing processing according to the determined position.

When the sensor device node is not the last node in the corresponding optimal path, the sensor device node forwards the optimal path to the sensor device node at the next position to realize the self-learning topology control of the topological relationship of this sensor device node; or otherwise, the sensor device node alters the direct-connected node list of this sensor device node according to the topological relationship alteration command information and alters the node address of the sensor device node of a next hop of the data directly forwarded by the sensor device node, to realize the self-learning topology control of the topological relationship of this sensor device node.

Step a6: Executing steps a4 to a5 successively for all sensor device nodes in the data perception layer (1), to realize the self-learning topology control of the topological relationship among all sensor device nodes in the system.

Step S3: Performing the data fusion according to the data provided by each edge computation device in the edge computation layer 3 by the cloud computation layer 4 to generate action instructions to be provided for application devices.

Step S4: Executing the actions corresponding to the received action instructions according to the action instructions transmitted by the cloud computation layer 4 by the application devices in the application layer 5.

It is to be noted that the edge computation devices in this embodiment can optimize the network topology at any time for the new node state by executing the self-learning topology control mechanism, thereby realizing the automatic dynamic adjustment of the network topology. Thus, the monitoring is maintained in a good operation state, and the change of the node in the IoT monitoring system at any time during the actual deployment process or the change of the node state caused when a new node accesses the monitoring system is avoided. Furthermore, by executing the self-learning topology control mechanism, the average transmission length of the data packet can be reduced, so that the average transmission length of the data packet is maintained in the best state, the energy is balanced, the service life of each node in the monitoring system, and the maintenance life of the node network constructed by the whole IoT monitoring system is ensured.

In order to improve the ability of the data perception layer in the intelligent IoT integrated perception system to resist against network attacks and ensure the efficiency and reliability of data transmission, the intelligent IoT integrated perception method in this embodiment further comprises: an operation of improving and optimizing the robustness of the current topological structure among all sensor device nodes in the data perception layer to output an optimal topological structure. Specifically, in this embodiment, the operation of improving and optimizing the robustness of the current topological structure among all sensor device nodes in the data perception layer to output an optimal topological structure comprises the following steps d1 to d7.

Step d1: An initialized IoT topological structure is generated based on the rules of the scale-free network model, and a plurality of network topology nodes are randomly deployed in the IoT topological structure, wherein, in the initialized IoT topological structure, each network topology node (i.e., the sensor device node in the data perception layer) corresponds to one fixed geographical position, and all network topology nodes have the same attributes. In addition, the probability of connecting a new network topology node joining in the IoT topological structure to a previous network topology node is positively related to the number of degrees of this previous network topology node.

For example, if it is assumed that M network topology nodes are randomly deployed in the initialized IoT topological structure, the $m^{th}$ network topology node is marked as $G_m$, and the coordinates of the geographical position of this network topology node are $(x_{G_m}, y_{G_m})$, where $1 \leq m \leq M$.

Step d2: According to the network Motif, all network Motifs conforming to four nodes are extracted from the initialized IoT topological structure, and each of the extracted network Motifs is respectively used as the minimum operation unit in the IoT topological structure optimization process. In this technical field, the network Motif or the Motif is a technical term well-known to those skilled in the art, and Motif refers a type of subgraph. The number of certain interconnected patterns found in a complex network by this subgraph is significantly larger than the number of these certain interconnected patterns in a random network. Here, the network Motif conforming to four nodes refers to an undirected graph composed of four nodes (i.e., four network topology nodes).

If it is assumed that Q network Motifs conforming to four nodes are obtained by the operation of extracting network Motifs conforming to four nodes in the step 2, the $q^{th}$ network Motif conforming to four nodes is marked as $Motif_q$, where $1 \leq q \leq Q$. Each $Motif_q$ is used as the minimum operation unit in the IoT topological structure optimization process. Here, the minimum operation unit is marked as $unit_q$, that is, $unit_q = Motif_q$.

Step d3: All minimum operation units having re-connectable edges are selected from all the extracted minimum operation units as operation units.

If it is assumed that minimum operation units $unit_1$ to $unit_Q$ are obtained by the extraction operation in the step 2, all minimum operation units having re-connectable edges are selected from the Q minimum operation units as operation units in the step 3. If it is assumed that all the selected minimum operation units having re-connectable edges respectively are $unit_1$, $unit_3$, $unit_4$ and $unit_5$, the minimum operation unit $Unit_1$ is used as an operation unit $Unit_1$, the minimum operation $unit_3$ is used as an operation unit $Unit_3$, the minimum operation unit $unit_4$ is used as an operation unit $Unit_4$, and the minimum operation unit $unit_5$ is used as an operation unit $Unit_5$.

Step d4: An edge connection relationship among some extracted operation units in the initialized IoT topological structure is altered, and the IoT topological structure obtained after altering the edge connection relationship is used as a new IoT topological structure.

If it is assumed that the initialized IoT topological structure in this embodiment is marked as $C_0$, a first alteration operation of altering the edge connection relationship is executed for the two operation units $Unit_4$ and $Unit_5$ among the four selected operation units. Thus, after the initialized IoT topological structure $C_0$ is subjected to this alteration operation, the topological structure will be changed. At this time, the IoT topological structure obtained after altering the edge connection relationship is used as a new IoT topological structure, and the new IoT topological structure obtained after the first alteration operation is marked as $C_1$.

Step d5: The operation in the step d4 is repeated for multiple times to obtain a plurality of new IoT topological structures, and the plurality of new IoT topological structures form a population, wherein the alteration operation for the edge connection relationship during each operation is not identical, and each new IoT topological structure in this population is used as an individual.

Then, as shown in the above step 4, a second alteration operation for some operation units is executed for the initialized IoT topological structure $C_0$, and the new IoT topological structure obtained after the first alteration operation is marked as $C_2$. If it is assumed that five alteration operations are performed and each operation is not identical, five new IoT topological structures are obtained, respectively, a new IoT topological structure $C_1$, a new IoT topological structure $C_2$, a new IoT topological structure $C_3$, a new IoT topological structure $C_4$ and a new IoT topological structure $C_5$; and, the five new IoT topological structures $C_1$ to $C_5$ form a population S, where $S=\{C_1, C_2, C_3, C_4, C_5\}$. Thus, each of the new IoT topological structures $C_1$ to $C_5$ in the population S is used as an individual.

Step d6: A robustness measurement indicator for measuring the robustness of the IoT topological structure is constructed, wherein the process of constructing the robustness measurement indicator comprises the following steps d61 to d65.

Step d61: The number of network Motifs conforming three nodes contained in the IoT network topological structure after the initialized IoT topological structure is subjected to each network attack is cumulatively counted.

Step d62: The total number of edges of the initialized IoT topological structure and the total number of network topology nodes of the initialized IoT topological structure are acquired, wherein the total number of edges of the initialized IoT topological structure is marked as E, and the total number of network topology nodes of the initialized IoT topological structure is marked as V, where V>3.

Step d63: The total number of edges in the union set formed by all network Motifs conforming to three nodes in the IoT topological structure after the $k^{th}$ network attack is acquired, where the total number of edges in the union set formed by all network Motifs conforming to three nodes is marked as MC(k), where $k\geq 1$.

It is to be noted that, in the step d63, after the IoT topological structure is subjected to the $k^{th}$ network attack, the edge sets of all network Motifs conforming to three nodes are united, and repetitive edges are removed to obtain a network topological structure. The number of edges contained in the network topological structure is counted. Here, the counted number of edges is the number of edges MC(k) in the union set formed by all network Motifs.

Step d64: Determination is performed according to the counted number of network Motifs conforming three nodes.

When the number of network Motifs conforming three nodes is zero, the process proceeds to step d65; or otherwise, the process proceeds to step d61.

Step d65: The counted number of network Motifs conforming three nodes is normalized, and the numerical number obtained after normalization is used as the robustness measurement indicator, wherein the robustness measurement indicator is marked as I:

$$I = \frac{3}{V-2}\sum \frac{MC(k)}{E}.$$

Step d7: Each new IoT topological structure in the formed population is optimized by a distributed artificial immune optimization algorithm, and the IoT topological structure with the best robustness measurement indicator is used as the best output of the IoT topological structure. Here, the process of using the IoT topological structure with the best robustness measurement indicator as the best output of the IoT topological structure comprises the following steps d71 to d77.

Step d71: N local optimization programs and 1 global optimization program are set, wherein the local optimization programs are independent of each other, each local optimization program runs one population P, and each local program respectively performs a population cross operation, a mutation operation and a selection operation on the run population P. The $n^{th}$ local optimization program is marked as $L_n$, and the global optimization program is marked as GL where $1\leq n\leq N$.

Step d72: A cross operation strategy is defined:

$$\text{motif}_i, \text{motif}_j \leftarrow G_i(, loc), G_j(, loc);$$

where $G_i(,loc)$ and $G_j(,loc)$ represent two different individuals of crossing positions in the same population at loc, and one side of a short chromosome at the cross position is selected for search; the chromosome is composed of all network Motifs conforming four nodes, and one Motif in the chromosome is called a Motif base; $\text{motif}_i$ represents a network Motif conforming to four nodes in one type individual; $\text{motif}_j$ represents a network Motif conforming to four nodes and a network Motif that can be crossed with $\text{motif}_i$, in another type individual the same as the individual type of $\text{motif}_i$.

The types of the two network Motifs $\text{motif}_i$ and $\text{motif}_j$ are determined. When $\text{motif}_i$; $\text{motif}_j$ and are of the same type, a cross operation is executed on the two network Motifs; or otherwise, two network Motifs that can be crossed are continuously searched in the same population.

Step d73: A mutation operation strategy is defined:

For one individual G in the population P, all operation units conforming to four network Motifs are extracted to form a chromosome.

The base positions of some mutable chromosome Motifs are randomly designated. If the base position of this chromosome Motif is Motif with a repeatable connection edge relationship, edge reconnection is performed; or otherwise, a next base position is continuously designated randomly.

Step d74: A selection operation strategy is defined:

$$P_{GL} = \{L_r, L_t, L, L_z\};$$

where $P_{GL}$ represents the population run by the global optimization program GL, and the population $P_{GL}$ is composed of elite population individuals $L_r, L_t, \ldots, L_z$ correspondingly selected by the local optimization program GL using different selection strategies. After the local optimization program GL executes the cross mutation operation, the robustness indicator for each individual is calculated, and two elite individuals with the highest robustness indicator are selected and transmitted to the global optimization program GL. The global optimization program GL receives the elite population individuals and continuously performs an optimization operation. Meanwhile, a communication queue Q is set in the global optimization program GL to store the elite population individuals selected by the local optimization program. The elite population individuals are individuals with the highest robustness indicator in one population, i.e., the best IoT topological structures.

In the global optimization program GL, the initialized global optimization program directly selects two populations in the communication queue Q, and then selects one population individual from the communication queue Q.

If the robustness measurement indicator of the selected population individual is superior to the average robustness measurement indicator of the global population, this population individual is selected; or otherwise, a next population individual in the communication queue Q is continuously selected.

Step d75: A "federal-state" communication mechanism and a global optimization mechanism are defined:

A communication queue Q is set in the global optimization program GL to store the elite population individuals selected by the local optimization program; and, during each iteration process, the global optimization program GL selects an elite population individual from the communication queue 2, and the population individual with the lowest robustness measurement indicator in the original population corresponding to the global optimization program GL is replaced with the selected elite population individual. Here, said "iteration" means the repeat ion of the operation in the step d7.

Step d76: The output robustness measurement indicator and the number of iterations are determined.

When the floating range of the output robustness measurement indicator is within the preset floating range (for example, the preset floating range is not higher than 0.001) and the current number of iterations does not exceed the preset maximum number of iterations (for example, the preset maximum number of iterations is set as 1000), the robustness measurement indicator is stored, and the process proceeds to step d77; or otherwise, the iteration is continuously performed until the number of iterations reaches the preset maximum number of iterations, and the iteration process is terminated.

Step d77: The IoT topological structure corresponding to the stored robustness measurement indicator is used as the IoT topological structure with the best robustness measurement indicator.

It is to be noted that, in the conventional IoT topological structure optimization scheme, a genetic optimization algorithm in a centralized computation mode is usually used, resulting in the disadvantages of high computation overhead, low population diversity and being easy to fall into premature convergence. Unlike the individual composition of the conventional genetic optimization algorithm, in this embodiment, network Motifs conforming to four nodes are used as the genetic composition of an individual (i.e., each new IoT topological structure), so that the search overhead for subsequent crossover and mutation is reduced. Moreover, in the present invention, by using the distributed artificial immune algorithm, the computation overhead can be reduced, the population diversity can be improved, and the global optimal solution (i.e., the IoT topological structure with the best robustness measurement indicator) can be searched more quickly. Thus, on the basis of fully measuring the network topological structure, the ability of the IoT topological structure to resist against malicious attacks is effectively improved, the risk of the IoT being paralyzed dude to attacks is reduced, and the efficiency and reliability of data transmission is ensured.

The protection scope of the present invention is not limited to each embodiments described in this description. Any changes and replacements made on the basis of the scope of the present invention patent and of the description shall be included in the scope of the present invention patent.

The invention claimed is:

1. An intelligent internet of things integrated perception system, comprising:
   a data perception layer (1);
   a connection and transmission layer (2);
   an edge computation layer (3);
   a cloud computation layer (4);
   an application layer (5) comprising a plurality of application devices;
   wherein,
   the data perception layer (1) comprises a plurality of sensor device nodes, each of the sensor device nodes monitors different environmental data;
   the connection and transmission layer (2) comprises a plurality of wireless communication modules, each sensor device node has at least one wireless communication module, the plurality of wireless communication modules form a wireless sensing network, the connection and transmission layer (2) is connected to the data perception layer (1);
   the connection and transmission layer (2) receives the environment monitoring data transmitted by the data perception layer (1), and the wireless communication modules of the connection and transmission layer (2) employ a self-learning topology control mechanism and a hierarchical collaborative perception node monitoring mechanism;
   the edge computation layer (3) comprises a plurality of edge computation devices, the edge computation layer (3) is connected to the connection and transmission layer (2) and receives the environment monitoring data transmitted by the connection and transmission layer (2);
   the cloud computation layer (4) comprises a cloud computation center, the cloud computation layer (4) is connected to the edge computation layer (3), the cloud computation center performs data fusion according to data provided by each edge computation device of the edge computation layer (3), and generates action instructions for the plurality of application devices;
   the application layer (5) is connected to the cloud computation layer (4), each application device receives an action instruction from the cloud computation center and executes the received action instruction;
   an edge device deploys the monitoring network topology of the data perception layer (1) by a method comprising the following steps c1 to c4:
   step c1: the edge device classifying all sensor device nodes in the data perception layer (1) into different levels;

step c2: the edge device generating a monitoring network topological relationship corresponding to the data perception layer (1) according to the communication range of each sensor device node, wherein the sensor device node monitors sensor device nodes of the same level within the communication range;

step c3: the edge device generating a node monitoring list alteration command for each sensor device node according to the generated monitoring network topological relationship; and step c4: the edge device transmitting the node monitoring list alteration command to all sensor device nodes in the data perception layer to realize the deployment of the monitoring network topology.

2. The integrated perception system of claim 1, wherein each sensor device node in the data perception layer (1) uploads data by a self-networking method, the self-networking method comprises the following steps:

step 1: pre-storing a direct-connected node list in each sensor device node, wherein the direct-connected node list in any sensor device node comprises a sensor device node directly connected to the any sensor device node, the node address of the current sensor device node, and the node address of a sensor device node for a next hop of the data directly forwarded by the current sensor device node;

step 2: using any sensor device node in the data perception layer (1) as a starting node of self-networking, and labeling the any sensor device node, wherein the labeling comprises labeling the any sensor device node as being networked, initializing the direct-connected node list of the any sensor device node as zero, and setting the node address of the any sensor device node as an edge device address;

step 3: when any new node joins in the data perception layer (1), the any new node searching and determining the networked nodes within the communication range of the new node;

when there are no networked nodes, the process proceeds to step 4; when a network node is found, the process proceeds to step 5;

step 4: the any new node continuously re-searching networked nodes within communication range of the new node for a preset time, and making judgment according to the result of re-searching;

when there are no networked nodes, the any new node labels itself as the starting node of self-networking, and the process proceeds to step 2; or otherwise, the process proceeds to step 5;

step 5: any new node locking the existing networked node, and interacting with the locked existing networked node;

step 6: determining whether a connection relationship is capable of being established between any new node and the existing networked node;

when the connection relationship is capable of being established between both, the new node is labeled as being in a networked state, and the node address of the locked networked node is set as the node address of the sensor device node of a next hop of the data directly forwarded by the any new node, and the process proceeds to step 7; or otherwise, the process proceeds to step 8;

step 7: all the networked sensor device nodes uploading the respective monitored environmental data to the edge computation devices through the connection and transmission layer (2), wherein the sensor device nodes that do not upload environmental data are in a sleep state; and step 8: the new node discarding the existing networked node, and the process proceeding to step 3.

3. The integrated perception system of claim 1, wherein the edge computation devices perform self-learning topology control on the topological relationship among all sensor device nodes in the system by a method comprising the following steps a1 to a6:

step a1: the edge device acquiring the connection relationship of a new sensor device node joining in the system in the data perception layer (1), and refreshing global sensor network topology information in the edge device, wherein the global sensor network topology information is the current topological connection relationship among all sensor device nodes in the data perception layer (1);

step a2: the edge device optimizing the topological connection relationship of all sensor device nodes in the data perception layer (1), and generating a new topological connection relationship;

step a3: the edge device comparing the new topological connection relationship with the current topological connection relationship to obtain a difference in topological connection relationship, and transmitting the difference in topological connection relationship as topological relationship alteration command information to a sensor device node whose topological connection relationship needs to be altered;

step a4: for each piece of topological relationship alteration command information, the edge device computing the optimal path from the sensor device node to the edge device corresponding to the topological relationship alteration command information;

step a5: the sensor device node that receives the topological relationship alteration command information determining the position of this sensor device node in the corresponding optimal path, and performing processing according to the determined position;

when the sensor device node is not the last node in the corresponding optimal path, the sensor device node forwards the optimal path to the sensor device node at the next position to realize the self-learning topology control of the topological relationship of this sensor device node; or otherwise, the sensor device node alters the direct-connected node list of this sensor device node according to the topological relationship alteration command information and alters the node address of the sensor device node of a next hop of the data directly forwarded by the sensor device node, to realize the self-learning topology control of the topological relationship of this sensor device node; and step a6: for all sensor device nodes in the data perception layer (1), executing steps a4 to a5 successively to realize the self-learning topology control of the topological relationship among all sensor device nodes in the system.

4. The integrated perception system of claim 1, wherein each sensor device node in the data perception layer (1) realizes node fault monitoring and reporting by a node monitoring method comprising the following steps b1 to b4:

step b1: pre-storing a node monitoring list in each sensor device node, wherein the node monitoring list in any sensor device node comprises a sensor device node sequence to be monitored by the any sensor device node, and the sensor device node sequence comprises at least one sensor device node to be monitored by the any sensor device node;

step b2: the any sensor device node transmitting a detection frame to all sensor device nodes in the sensor device node sequence in the stored node monitoring list when any sensor device node in the data perception layer (1) executes node monitoring;

step b3: upon receiving the detection frame, the sensor device node in the sensor device node sequence in the node monitoring list transmitting an acknowledgement frame to the sensor device node that transmits the detection frame; and step b4: the any sensor device node that transmits the detection frame making judgment according to the acknowledgement frame fed back by each sensor device node in the sensor device node sequence;

when the any sensor device node does not receive the acknowledgement frame from any sensor device node in the sensor device node sequence for N consecutive times, it is determined that this sensor device node in the sensor device node sequence is faulted; or otherwise, it is determined that this sensor device node in the sensor device node sequence is not faulted, where N≥2.

5. An intelligent internet of things integrated perception method of the integrated perception system of claim 1, wherein the method comprises the following steps:

monitoring environmental data by each sensor device node in the data perception layer (1), and transmitting the monitored environmental data to the edge computation layer (3) through the connection and transmission layer (2);

performing processing according to the received environment monitoring data transmitted through the connection and transmission layer (2) by the edge computation layer (3), and transmitting the data obtained after fusion to the cloud computation layer (4), wherein the edge computation layer (3) executes self-learning topology control on the topological relationship among all sensor device nodes in the intelligent IoT integrated perception system;

performing the data fusion according to the data provided by each edge computation device in the edge computation layer (3) by the cloud computation layer (4) to generate action instructions to be provided for application devices; and executing the actions corresponding to the received action instructions according to the action instructions transmitted by the cloud computation layer (4) by the application devices in the application layer (5).

6. The integrated perception method of claim 5, wherein the edge computation devices perform self-learning topology control on the topological relationship among all sensor device nodes in the system by a method comprising the following steps a1 to a6:

step a1: the edge device acquiring the connection relationship of a new sensor device node joining in the system in the data perception layer (1), and refreshing the global sensor network topology information in the edge device, wherein the global sensor network topology information is the current topological connection relationship among all sensor device nodes in the data perception layer (1);

step a2: the edge device optimizing the topological connection relationship of all sensor device nodes in the data perception layer (1), and generating a new topological connection relationship;

step a3: the edge device comparing the new topological connection relationship with the current topological connection relationship to obtain a difference in topological connection relationship, and the difference in topological connection relationship is transmitted as topological relationship alteration command information to a sensor device node whose topological connection relationship needs to be altered;

step a4: the edge device computing the optimal path from the sensor device node to the edge device corresponding to the topological relationship alteration command information according to each piece of topological relationship alteration command information;

step a5: the sensor device node that receives the topological relationship alteration command information determining the position of this sensor device node in the corresponding optimal path, and performing processing according to the determined position;

when the sensor device node is not the last node in the corresponding optimal path, the sensor device node forwards the optimal path to the sensor device node at the next position to realize the self-learning topology control of the topological relationship of this sensor device node; or otherwise, the sensor device node alters the direct-connected node list of this sensor device node according to the topological relationship alteration command information and alters the node address of the sensor device node of a next hop of the data directly forwarded by the sensor device node, to realize the self-learning topology control of the topological relationship of this sensor device node; and step a6: executing steps a4 to a5 successively for all sensor device nodes in the data perception layer (1), to realize the self-learning topology control of the topological relationship among all sensor device nodes in the system.

7. The integrated perception method of claim 5, further comprising deploying the monitoring network topology of the data perception layer (1) by the edge device, according to a method comprising the following steps c1 to c4:

step c1: the edge device classifying all sensor device nodes in the data perception layer (1) into different levels;

step c2: the edge device generating a monitoring network topological relationship corresponding to the data perception layer (1) according to the communication range of each sensor device node, wherein the sensor device node monitors sensor device nodes of the same level within the communication range;

step c3: the edge device generating a node monitoring list alteration command for each sensor device node according to the generated monitoring network topological relationship;

step c4: the edge device transmitting the node monitoring list alteration command to all sensor device nodes in the data perception layer (1) to realize the deployment of the monitoring network topology.

8. The integrated perception method of claim 5, further comprising performing node fault monitoring and reporting by each sensor device node in the data perception layer (1) according to a node monitoring method comprising the following steps b1 to b4:

step b1: pre-storing a node monitoring list in each sensor device node, wherein the node monitoring list in any sensor device node comprises a sensor device node sequence to be monitored by the any sensor device node, and the sensor device node sequence comprises at least one sensor device node to be monitored by the any sensor device node;

step b2: when any sensor device node in the data perception layer (1) executes node monitoring, the any sensor device node transmitting a detection frame to all sensor device nodes in the sensor device node sequence in the stored node monitoring list;

step b3: upon receiving the detection frame, the sensor device node in the sensor device node sequence in the node monitoring list transmitting an acknowledgement frame to the sensor device node that transmits the detection frame; and step b4: the any sensor device node that transmits the detection frame making judgment according to the acknowledgement frame fed back by each sensor device node in the sensor device node sequence;

when the any sensor device node does not the acknowledgement frame from any sensor device node in the sensor device node sequence for N consecutive times, it is determined that this sensor device node in the sensor device node sequence is faulted; or otherwise, it is determined that this sensor device node in the sensor device node sequence is not faulted, where N≥2.

9. The integrated perception method of claim 5, further comprising an operation of improving and optimizing the robustness of the current topological structure among all sensor device nodes in the data perception layer (1) to output an optimal topological structure.

10. The integrated perception method of claim 9, wherein the operation of improving and optimizing the robustness of the current topological structure further comprises steps d1 to d7:

step d1: generating an initialized topological structure based on rules of a scale-free network model, and randomly deploying a plurality of network topology nodes in the initialized topological structure, wherein, in the initialized topological structure, each network topology node corresponds to one fixed geographical position;

step d2: extracting all network motifs conforming to four nodes from the initialized topological structure, and using each extracted network motif as the minimum operation unit in the improving and optimization operation;

step d3: selecting all minimum operation units having re-connectable edges from among the extracted minimum operation units, as operation units;

step d4: altering an edge connection relationship among some extracted operation units in the initialized topological structure to obtain a new topological structure, and repeating step d4 multiple times to obtain a plurality of new topological structures;

step d5: forming from the plurality of new topological structures a population, wherein no new topological structure of the population is formed from identical alterations performed in step d4 as any other new topological structure within the population, and each new topological structure is used as an individual;

step d6: constructing a robustness measurement indicator for measuring the robustness of the new topological structures; and step d7: optimizing each new topological structure in the population by a distributed artificial immune optimization algorithm, and selecting the new topological structure having the best robustness measurement indicator as the best output of the method.

11. The intelligent internet of things integrated perception system of claim 1, wherein the plurality of sensor device nodes of the data perception layer (1) is networked by a pre-stored direct-connected node list stored in each sensor device node, each sensor device node is capable of initializing self-networking, each sensor device node is capable of integrating a new node into the existing plurality of sensor device nodes, each sensor device node is capable of transmitting data to any other sensor device node within its pre-stored direct-connected node list, and each sensor device node is capable of transmitting its respective environmental data to the connection and transmission layer.

12. The intelligent internet of things integrated perception system of claim 11, wherein the sensor devices nodes of the plurality of sensor device nodes of the data perception layer (1) comprise ultrasonic sensors, humidity sensors, temperature sensors, luminosity sensors, gas sensors, air pressure sensors, sound sensors, or wind speed sensors.

13. The intelligent internet of things integrated perception system of claim 1, wherein the application layer (5) comprises wireless and/or wired connections between each application device and one or more intelligent gateways connected to the cloud computation layer (4), so that the application devices are remotely controlled by the system.

* * * * *